US012592136B2

(12) United States Patent
Wright et al.

(10) Patent No.: US 12,592,136 B2
(45) Date of Patent: Mar. 31, 2026

(54) SELF-TESTING DETECTOR

(71) Applicant: GENTEX CORPORATION, Zeeland, MI (US)

(72) Inventors: Thomas S. Wright, Hamilton, MI (US); Darin D. Tuttle, Byron Center, MI (US); Alexander R. Arent, Holland, MI (US); Sue F. Franz, Allegan, MI (US); Xiaoxu Niu, Grand Rapids, MI (US); Ryan Barrido Balili, Holland, MI (US); Gregory J. Nagel, Caledonia, MI (US)

(73) Assignee: GENTEX CORPORATION, Zeeland, MI (US)

( * ) Notice: Subject to any disclaimer, the term of this patent is extended or adjusted under 35 U.S.C. 154(b) by 17 days.

(21) Appl. No.: 18/633,754

(22) Filed: Apr. 12, 2024

(65) Prior Publication Data

US 2024/0346901 A1 Oct. 17, 2024

Related U.S. Application Data

(60) Provisional application No. 63/495,791, filed on Apr. 13, 2023.

(51) Int. Cl.
*G08B 17/107* (2006.01)

(52) U.S. Cl.
CPC .................................. *G08B 17/107* (2013.01)

(58) Field of Classification Search
CPC .. G08B 29/145; G08B 17/107; G08B 17/117; G08B 29/043; G08B 29/046; G08B 17/103; G08B 17/10
See application file for complete search history.

(56) References Cited

U.S. PATENT DOCUMENTS 4,531,114 A * 7/1985 Topol ........................ A62B 3/00
340/533
4,827,244 A * 5/1989 Bellavia ............... G08B 29/145
340/630

(Continued)

FOREIGN PATENT DOCUMENTS

CN 104637234 A 5/2015
CN 215338735 U 12/2021

OTHER PUBLICATIONS

Honeywell International Inc., Notifier by Honeywell, Self-Test Series Self-Testing Addressable Detectors, 2022, pp. 3.

*Primary Examiner* — Curtis J King
(74) *Attorney, Agent, or Firm* — Price Heneveld LLP; Brian James Brewer

(57) ABSTRACT

The present disclosure is directed, at least in part, to a self-testing detector device. The detector device may comprise: a chamber, a light source, a sensor, a substance emitter, and/or a speaker. The chamber may be configured to allow ambient air and substances to enter. The lights source may be configured to emit light into the chamber. In some embodiments, the sensor may be configured to detect light within the chamber. In other embodiments, the sensor may be configured to detect certain substances within the chamber directly. The substance emitter may be configured to emit substances during a test cycle of the detector device. The speaker may be configured to emit an audible alarm when the light or substances detected by the sensor pass a threshold.

20 Claims, 7 Drawing Sheets

(56) References Cited

U.S. PATENT DOCUMENTS 5,450,066 A * 9/1995 Brighenti ............... G08B 17/06 340/596
5,611,620 A * 3/1997 Wantz .................. G08B 29/145 374/1
5,617,079 A * 4/1997 Harrison ................ G08B 17/00 429/96
5,670,946 A * 9/1997 Ellwood .............. G08B 29/145 340/630
6,015,230 A * 1/2000 Wantz .................. G08B 29/145 374/1
6,225,910 B1 * 5/2001 Kadwell .............. G08B 29/043 340/630
6,967,582 B2 * 11/2005 Tice ..................... G08B 29/183 340/630
8,205,478 B1 * 6/2012 Hallisey ............... G08B 29/145 73/1.06
8,353,625 B1 * 1/2013 Feiter ................... G08B 29/145 374/121
11,024,154 B1 * 6/2021 Lang ...................... G08B 29/24
2002/0134131 A1 * 9/2002 Pepper ................. G08B 29/145 73/1.01
2004/0035179 A1 * 2/2004 Koch ................... G08B 29/145 374/2
2005/0212678 A1 * 9/2005 Berg ........................ G08B 5/40 340/425.5
2007/0194907 A1 * 8/2007 Tawil ..................... G08B 29/14 340/514
2008/0018485 A1 * 1/2008 Kadwell .............. G08B 17/107 340/630
2009/0078065 A1 * 3/2009 Rossiter ............... G08B 29/145 73/865.6
2009/0308134 A1 * 12/2009 Pepper ................... G08B 29/12 73/1.06
2015/0302727 A1 * 10/2015 Piccolo, III .......... G08B 17/107 340/514
2015/0310732 A1 * 10/2015 Piccolo, III .......... G08B 29/145 340/515
2016/0240059 A1 * 8/2016 Stowell ................ G08B 17/113
2017/0124829 A1 * 5/2017 Tennies .................. G08B 17/06
2017/0287318 A1 * 10/2017 Moffa .................. G08B 29/043
2018/0075733 A1 * 3/2018 Brown ................. G08B 29/145
2018/0293878 A1 * 10/2018 Penney ............... B05B 17/0646
2019/0291866 A1 * 9/2019 Jegodtka ................ G08B 17/06
2020/0319154 A1 * 10/2020 Dohi .................. G01N 33/0016
2020/0320857 A1 * 10/2020 Lang .................... G08B 29/145
2021/0046346 A1 * 2/2021 Fujiwara ............... G01J 5/0014
2021/0065536 A1 * 3/2021 Dearden ................ G08B 17/10
2021/0227879 A1 7/2021 Ito et al.
2022/0058929 A1 2/2022 Dearden et al.
2022/0351643 A1 11/2022 Lucas
2023/0384198 A1 * 11/2023 Wolf .................... G08B 29/145
2024/0337577 A1 * 10/2024 Penney ................ G01N 15/075
2024/0346900 A1 * 10/2024 Capek .................. G08B 29/145
2025/0006040 A1 * 1/2025 Wolf .................... G08B 29/145
2025/0108243 A1 * 4/2025 Barson ................. G08B 29/145

* cited by examiner

SELF-TESTING DETECTOR

CROSS-REFERENCE TO RELATED APPLICATION

This Application claims the benefit of U.S. Provisional Patent Application No. 63/495,791 filed 13 Apr. 2023, the entirety of which is incorporated herein by reference.

FIELD OF INVENTION

The present disclosure relates, in general, to substance detectors and, more particularly, to self-testing substance detectors.

BACKGROUND OF INVENTION

Various types of detectors, such as smoke or carbon monoxide detectors, are common in commercial environments. These detectors must be tested every year; this is expensive and time-consuming. For example, smoke detectors are typically tested by walking to each detector, exposing it to an aerosol in order to simulate smoke, and waiting to see if an alarm is triggered. Accordingly, there is a need for improved detectors, which do not rely on such expensive testing.

SUMMARY

In accordance with the present disclosure, the problems associated with testing detectors have been substantially reduced or eliminated.

According to one aspect of the present disclosure, a detector device is disclosed. The detector device may comprise: a chamber, a light source, a sensor, a substance emitter, and/or a speaker. The chamber may be configured to allow ambient air and substances to enter. The light source may be configured to emit light into the chamber. The sensor may be configured to detect light within the chamber. The substance emitter may be configured to emit one or more substances during a test cycle of the detector device. The speaker may be configured to emit an audible alarm when the light sensed by the sensor passes a threshold. In some embodiments, the substance emitter is disposed proximate the chamber. In other embodiments, the substance emitter is disposed within the chamber. In some embodiments, the speaker may be disabled during the test cycle.

In some embodiments, the substance emitter may be a filament configured for ignition during the test cycle to give off the one or more substances. In other embodiments, the substance emitter may be a chemical reactor configured to facilitate a chemical reaction between at least two different chemicals to produce and emit the one or more substances during the test cycle. In some such embodiments, the chemical reactor may facilitate the chemical reaction by housing the at least two different chemicals separated from one another and combining them during the test cycle. In other such embodiments, the chemical reactor may facilitate the chemical reaction by housing the at least two different chemicals together and providing a non-chemical stimulus during the test cycle to initiate the chemical reaction.

In other embodiments, the substance emitter may be a resistor configured to emit the one or more substances when exposed to an electrical current traveling therethrough during the test cycle. In some such embodiments, the resistor may have a coating which is configured to emit the one or more substances upon the resistor's exposure to the electrical current. The coating may comprise propylene glycol.

In some embodiments, the substance emitter may be configured to exhaust a supply of the one or more substances so as to cause the light sensed by the sensor to pass the threshold for only one test cycle. In some embodiments, the detector device may have a plurality of substance emitters. In some such embodiments, the plurality of substance emitters may include a first substance emitter and a second substance emitter on opposite sides of an optical pathway between the light source and the sensor relative to one another.

In some embodiments, the light detected by the sensor may be the light emitted from the light source, and the audible alarm may be emitted when the light sensed by the sensor falls below the threshold. In other embodiments, the light detected by the sensor may be scattered by the one or more substances released into the chamber and not directly received from the light source, and the audible alarm may be emitted when the light sensed by the sensor is above the threshold.

In some embodiments, the detector device may further comprise a user interface configured to receive an input from a user to initiate the test cycle. Additionally, or alternatively, the detector device may further comprise a feedback device configured to provide a user with feedback to indicate a successful test cycle. In some such embodiments, the feedback device may determine a successful test cycle based, at least in part, on a second sensor configured to detect vibrations from the audible alarm.

According to another aspect of the present disclosure, a detector device is disclosed. The detector device may comprise: a chamber, a substance sensor, a substance emitter, and/or a speaker. The chamber may be configured to allow ambient air and one or more substances to enter. The substance sensor may be disposed within the chamber and configured to detect one or more certain substances. The substance emitter is configured to emit one or more substances detectable by the substance sensor during a test cycle of the detector device. The speaker may be configured to emit an audible alarm when the substance sensor detects the certain one or more substances above a threshold. In some embodiments, the certain one or more substances may include carbon monoxide. In some embodiments, the substance emitter is disposed proximate the chamber. In other embodiments, the substance emitter is disposed within the chamber. In some embodiments, the speaker may be disabled during the test cycle.

In some embodiments, the substance emitter may be a filament configured for ignition during the test cycle to give off the one or more substances. In other embodiments, the substance emitter may be a chemical reactor configured to facilitate a chemical reaction between at least two different chemicals to produce and emit the one or more substances during the test cycle. In some such embodiments, the chemical reactor may facilitate the chemical reaction by housing at least two of the at least two different chemicals separated from one another and combining them during the test cycle. In other such embodiments, the chemical reactor may facilitate the chemical reaction by housing the at least two different chemicals together and providing a non-chemical stimulus during the test cycle to initiate the chemical reaction.

In other embodiments, the substance emitter may be a resistor configured to emit one or more substances when exposed to an electrical current traveling therethrough during the test cycle. In some such embodiments, the resistor may have a coating which is configured to emit the one or more substances upon the resistor's exposure to the electrical current. The coating may comprise propylene glycol.

In some embodiments, the substance emitter may be configured to emit a sufficient quantity of the one or more substances to cause the light sensed by the sensor to pass the threshold for only one test cycle. In some embodiments, the detector device may have a plurality of substance emitters. In some such embodiments, the plurality of substance emitters may include a first substance emitter and a second substance emitter on opposite sides of an optical pathway between the light source and the sensor relative to one another.

In some embodiments, the detector device may further comprise a user interface configured to receive an input from a user to initiate the test cycle. Additionally, or alternatively, the detector device may further comprise a feedback device configured to provide a user with feedback to indicate a successful test cycle. In some such embodiments, the feedback device may determine a successful test cycle based, at least in part, on a second sensor configured to detect vibrations from the audible alarm.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

DETAILED DESCRIPTION

For the purposes of description herein, the specific devices and processes illustrated in the attached drawings and described in this disclosure are simply exemplary embodiments of the inventive concepts defined in the appended claims. Hence, specific characteristics relating to the embodiments disclosed herein are not limiting, unless the claims expressly state otherwise.

Prior detectors have onerous and expensive testing requirements. The presently described improved detector devices 10 substantially reduce or eliminate the expense and time consumption of such testing.

Figure 1:
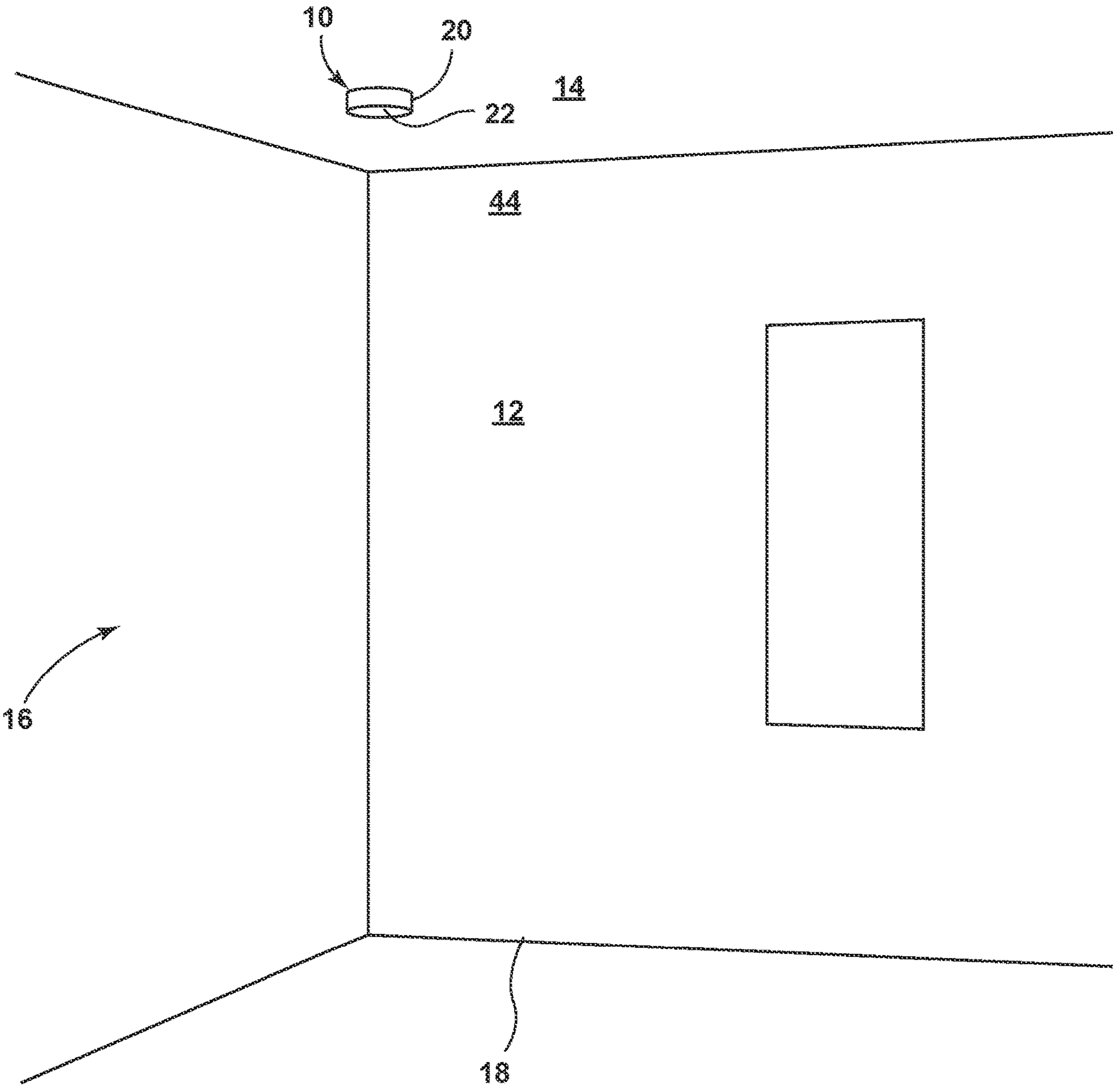
FIG. 1 is a perspective view of a detector device of the present disclosure on a ceiling within a room of a building.

As illustrated in FIG. 1, the detector device 10 may be disposed in an indoor environment 12, such as on a ceiling 14 of a room 16 within a building 18. The indoor environment 12 may be a commercial environment, such as those that are required to have regular and periodic verification testing of the detector device 10.

Figure 2:
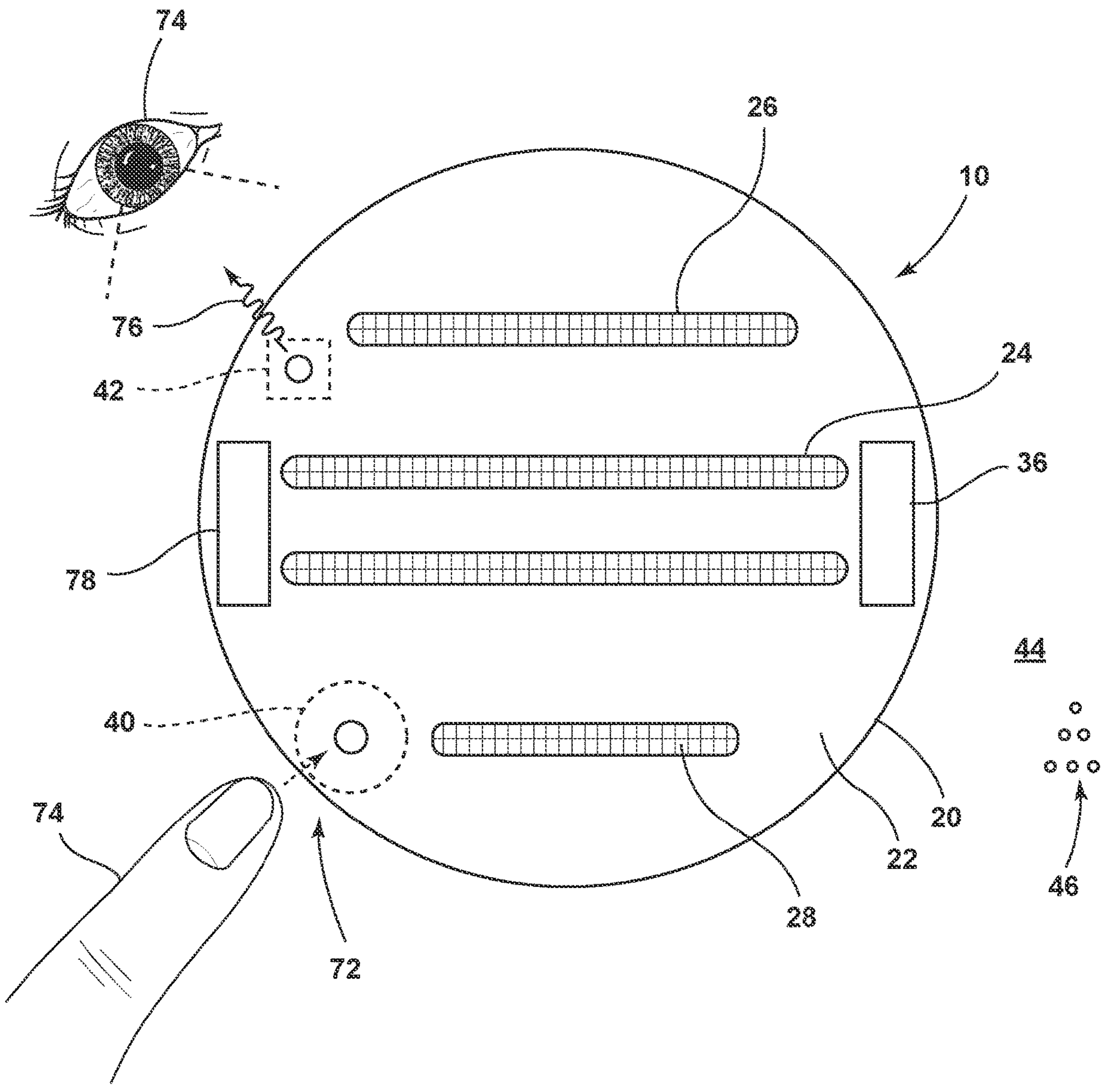
FIG. 2 is a plan view of the detector device, illustrating a housing with a cover and an inlet therethrough for the passage of substances from the ambient air, which the detector device is configured to detect.

Referring additionally to FIG. 2, the detector device 10 includes structural components, such as a housing 20. The housing 20 can include a cover 22. The cover 22 is exposed to the indoor environment 12. The structural components, such as the cover 22, can include an inlet 24 and an outlet 26. Further, in some embodiments, the inlet 24 and/or outlet 26 may have a screen 28. The screen 28 is intended to minimize intrusion through the inlet 24 from insects and other relatively large contaminants.

Figure 3:
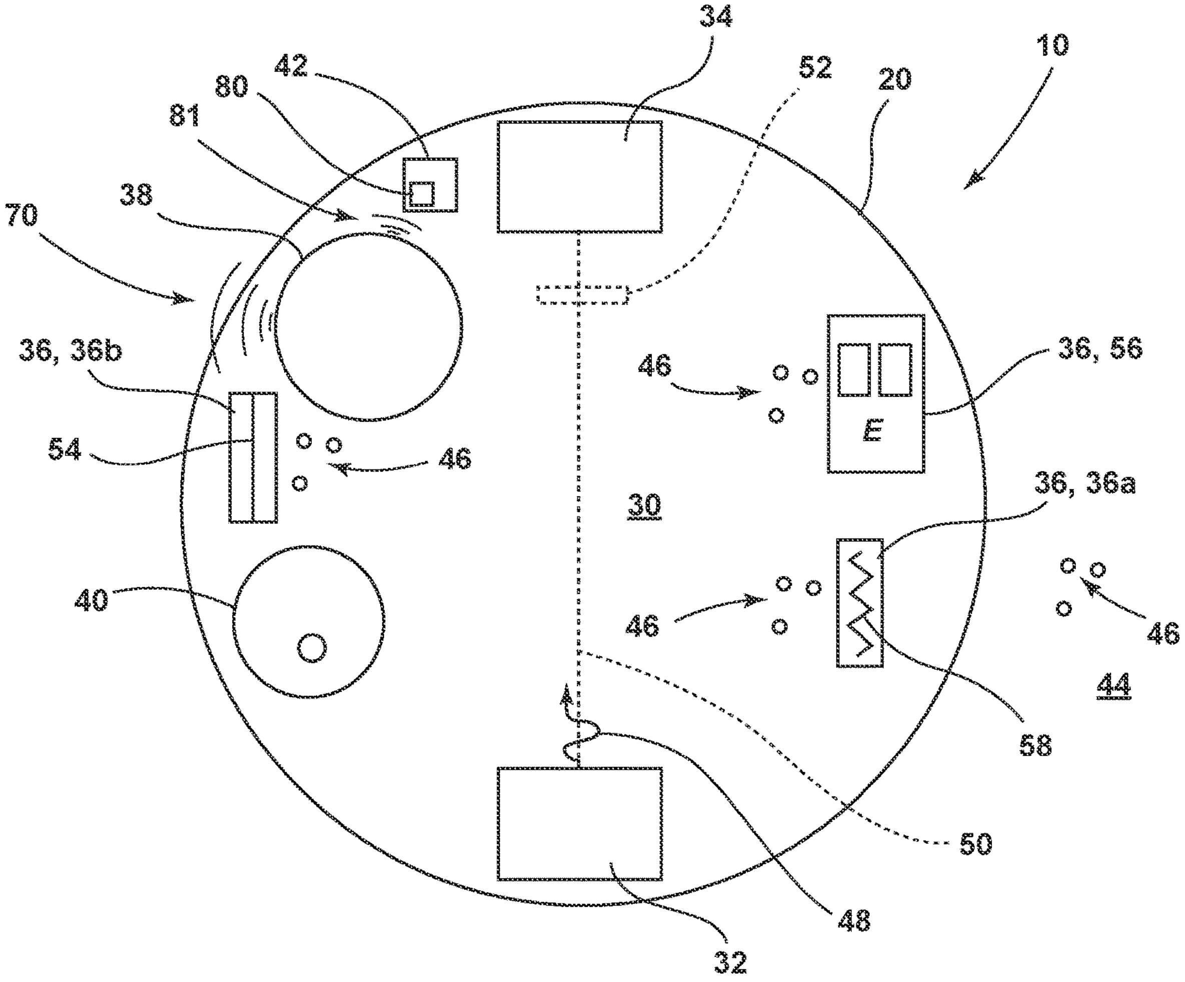
FIG. 3 is a plan view of the detector device without the cover, illustrating a chamber within the housing including substance emitters to emit one or more substances and a sensor to sense the one or more substances, the substance emitters emitting the one or more substances during a test cycle to determine whether the sensor is sensing properly and the detector device is functioning properly.

Referring additionally to FIG. 3, in embodiments, the detector device 10 includes a chamber 30, a light source 32, a sensor 34, a substance emitter 36, a speaker 38, a user interface 40, and/or a feedback device 42. Chamber 30 may be formed and/or defined by the structural components of detector device 10, such as the housing 20 and the cover 22. The inlet 24 allows ambient air 44 and one or more substances 46 to enter chamber 30. The ambient air 44 and the one or more substances 46 may include smoke particles, carbon dioxide molecules, molecules of one or more other gases, radioactive substances, and/or other substances, which may be detected by sensor 34. The outlet 26 allows ambient air 44 and the one or more substances 46 to exit chamber 30.

As further discussed below, detector device 10 may be self-testing. Accordingly, detector device 10 may be configured and/or operable to enter a test mode. In the test mode, detector device 10 may undergo one or more test cycles in which the operability of the sensor 34, among other things, is determined.

Light source 32 may be configured to emit light 48. "Light" for purposes of this disclosure means electromagnetic radiation of one or more desired wavelengths or wavelength ranges. The light 48 may be emitted into chamber 30. Accordingly, light source 32 may be disposed in chamber 30. Further, in some embodiments, the light 48 may be substantially emitted along an axis 50. For example, light source 32, may comprise one or more laser, light emitting diodes (LEDs), or halogen, quartz, incandescent, or compact fluorescent ("CFL") light bulbs.

Sensor 34 may be configured to detect the presence of the one or more substances 46 and/or light 48 within chamber 30. Thus, sensor 34 for example, may be a light sensor and/or an electrochemical sensor. Further, sensor 34 may be disposed in chamber 30. In embodiments where sensor 34 is configured to detect light 48, the detected light 48 may be the light 48 emitted from light source 32. In some such embodiments, sensor 34 may be disposed on the axis 50 with the light 48 emitted from light source 32. To facilitate such an arrangement, in some embodiments, light source 32 may be optically directed toward sensor 34. Accordingly, sensor 34 may be configured to sense light 48 emitted substantially directly from light source 32. In other such embodiments, sensor 34 may be disposed off the axis 50 with the light 48 emitted from light source 32. To facilitate such an arrangement, the emitted light 48 may be blocked from the direction of sensor 34 by a block 52 or emitted in a direction or directions exclusive of the direction of sensor 34. Blocking of the emitted light 48 may be facilitated by structure. For example, the block 52 can be a component of the housing 20 or the cover 22 when attached to the housing 20. Additionally, or alternatively, the block 52 can be a bi-metal element, an electro-active element (e.g., polymers, electrochromics, liquid crystal, electro-phoretics, and electro-optics), a piezoelectric element, or an electro-mechanical actuator, among other things. Accordingly, in such an embodiment, sensor 34 may not substantially sense the emitted light 48 directly from light source 32. In embodiments where sensor 34 is configured to detect certain of the one or more substances 46, these substances 46 may include smoke substances, carbon dioxide molecules, molecules of one or more other gases, radioactive substances, and/or other substances. In such instances, the sensor 34 can be referred to herein as a substance sensor. Particular examples of the sensor 34 include a photodiode, a photodiode array, a photodiode transistor, an ionization detector, metal oxide sensors, heat sensors, and humidity sensors.

Substance emitter 36 may be configured and/or operable to emit the one or more substances 46 during a test cycle based, at least in part, on detector device 10 being in a test mode. In some embodiments, the emitted substances 46 may be the same as or similar to the one or more substances 46 that the sensor 34 is configured to detect. In some embodiments, substance emitter 36 may be disposed within chamber 30, such as illustrated at FIG. 3. In other embodiments, substance emitter 36 may be disposed outside chamber 30 proximate the inlet 24, such as illustrated at FIG. 2. Accordingly, the one or more substances 46 emitted may occupy chamber 30. Disposing substance emitter 36 outside of chamber 30 may have the advantage of causing the test to fail in instances where the inlet 24 may be blocked, not allowing the one or more substances 46 from the ambient air 44 to enter chamber 30. Substance emitter 36, for example, may comprise a filament 54, a chemical reactor 56, and/or a resistor 58.

Figure 4:
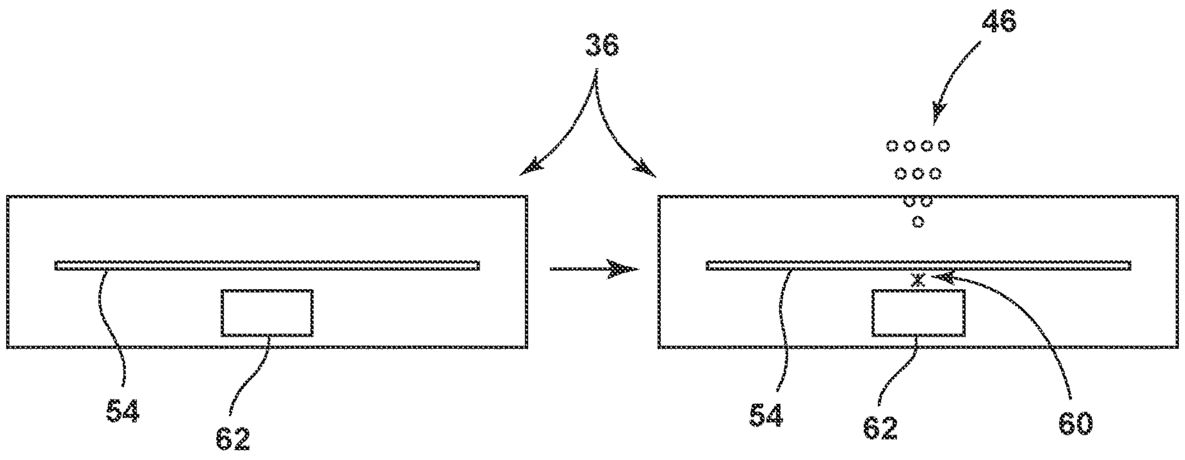
FIG. 4 is a schematic view of an embodiment of the substance emitter, illustrating the substance emitter including a filament and an ignition source (left) that during a test cycle (right) generates a spark to ignite the filament and thereby generate the one or more substances for the sensor to sense.

Referring now to FIG. 4, as mentioned, in embodiments, substance emitter 36 is or includes a filament 54 (see FIG. 4 left). During a test cycle when detector device 10 is in a test mode (see FIG. 4 right), the filament 54 may be ignited by a spark 60 from an ignition source 62. The filament 54 may be comprised of cotton, paper, or other fiber. Additionally, the ignited filament 54 may be configured to give off the substances 46.

Figure 5:
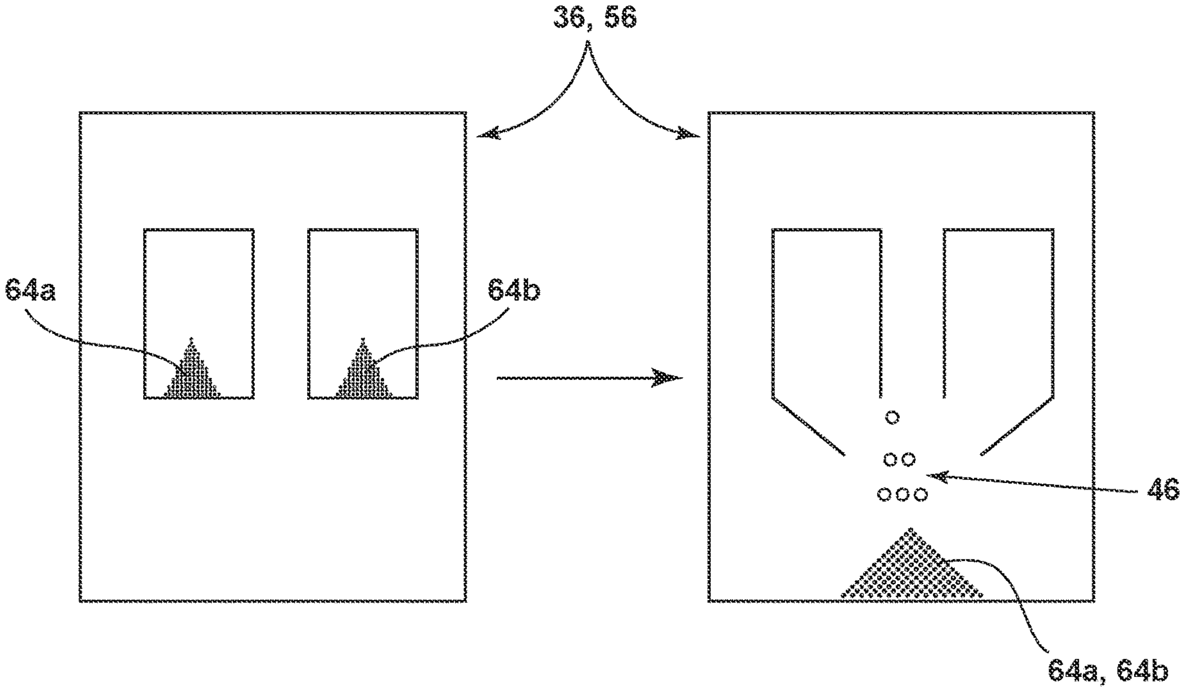
FIG. 5 is a schematic view of an embodiment of the substance emitter, illustrating the substance emitter including two different chemicals (left) that during a test cycle (right) are brought together to chemically react and thereby generate the one or more substances for the sensor to sense.

Referring now to FIG. 5, in embodiments as mentioned, the substance emitter 36 is or includes the chemical reactor 56. During a test cycle when detector device 10 is in a test mode, chemical reactor 56 may facilitate a chemical reaction between at least two different chemicals 64*a*, 64*b* to produce and emit the one or more substances 46. In some such embodiments, the chemical reactor 56 may facilitate the chemical reaction by housing the at least two different chemicals 64*a*, 64*b* separated from one another (FIG. 5 left) and physically combining them during the test cycle (FIG. 5 right). The combination may produce a spontaneous reaction. In other such embodiments, the chemical reactor 56 may facilitate the chemical reaction by non-reactively housing the at least two different chemicals 64*a*, 64*b* together and providing a non-chemical stimulus E (see FIG. 3) during the test cycle to initiate the chemical reaction and produce the substances 46. For example, the non-chemical stimulus E may be the exposure of the chemicals to light 48 and/or heat.

Similarly, the substance emitter 36 emits the one or more substances 46 in response to ultraviolet light received from a UV light emitter. For example, the ultraviolet light may prompt the release of molecules of the one or more substances 46 from a supply thereof. As another example, the substance emitter 36 can include a supply of two otherwise unreactive substances, which, upon receiving ultraviolet light (as the non-chemical stimulus E) from the UV light emitter, chemically react and generate the one or more substances 46 to be detected during the test cycle. In either example, the length of time that the substance emitter 36 receives the UV light, or the intensity of the UV light received, can control the amount of the one or more substances 46 released during the test cycle. That control permits the substance emitter 36 to be utilized for multiple test cycles without exhausting the supply of the one or more substances 46 to be released.

Figure 6:
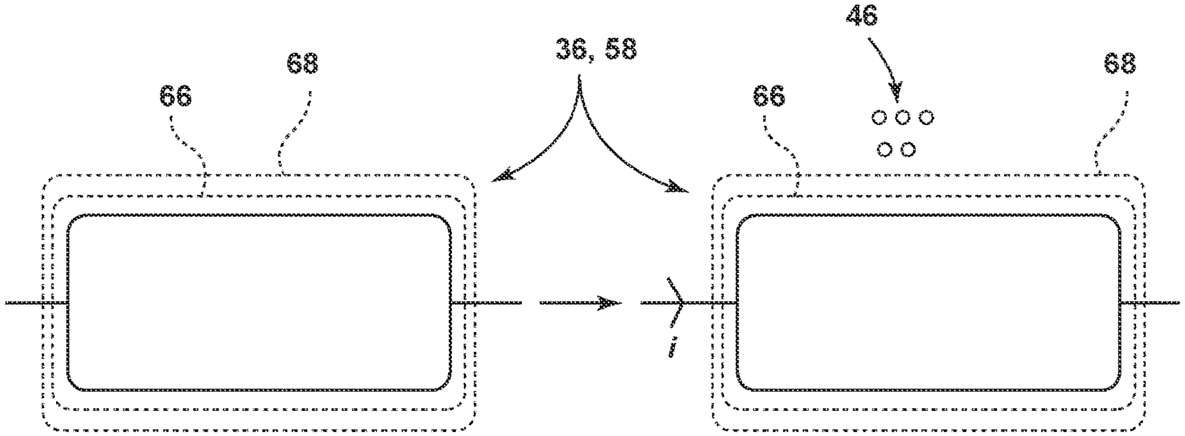
FIG. 6 is a schematic view of an embodiment of the substance emitter, illustrating the substance emitter including a resistor with a coating (left) that during a test cycle (right) is exposed to electrical current that causes the resistor to generate heat that causes the coating to release the one or more substances for the sensor to sense.

Referring now to FIG. 6, in embodiments where substance emitter 36 is the resistor 58, the resistor 58 (FIG. 6 left) may be substantially electrically resistive to electrical current i traveling therethrough. Thus, in some embodiments, the resistor 58 may be configured to heat when exposed to the electrical current i. Further, the resistor 58 may be exposed to the electrical current i during a test cycle (FIG. 6 right) when detector device 10 is in the test mode. Additionally, the resistor 58 may be configured and/or operable to emit the one or more substances 46 when exposed to the electrical current i.

In some embodiments, the resistor 58 may be coated with a coating 66. The coating 66 may be configured to emit the one or more substances 46 (e.g. carbon monoxide, solid particles, and so on) into the air upon exposure to heat from the resistor 58. In some such embodiments, the coating 66 may include propylene glycol. In other such embodiments, the coating 66 may include formic acid, oxalic acid, sulfuric acid, zinc, and/or calcium carbonate. In some embodiments, the coating 66 may be substantially covered with a preservative layer 68. The preservative layer 68 may be configured to substantially inhibit degradation or drying out of the coating 66. In some such embodiments, the preservative layer 68 may include glycerin. Because the exposure to the electrical current i can be controlled in terms of time and/or intensity, the coating 66 can be utilized for numerous test cycles without exhaustion.

In some embodiments, substance emitter 36 may be substantially single use. Accordingly, after one use, the effectiveness of substance emitter 36 to emit enough of the one or more substances 46 may be substantially exhausted. In other embodiments, substance emitter 36 may be used more than once. For example, in such embodiments, the coating 66 of the resistor 58 may have a sufficient amount and/or thickness or the chemical reactor 56 may house a sufficient amount of chemicals of the one or more substances 46 that may be emitted during at least one additional test cycle after the first test cycle.

Additionally, detector device 10 may comprise a plurality of substance emitters 36. In some embodiments, only one substance emitter 36 may be utilized during each test cycle. In such embodiments, one of the substance emitters 36 is used during a first test cycle, another one of the substance emitters 36 is used during a second test cycle, and so on. In other embodiments, multiple substance emitters 36 may be utilized during a single test cycle. Having a plurality of substance emitters 36 may be beneficial because once a first substance emitter 36 is substantially exhausted, one or more additional substance emitters 36 may be utilized, and two or more substance emitters 36 may be utilized to increase their cumulative effect. This may allow for increased test efficacy as well as a greater lifespan for the detector device 10. The additional substance emitters 36 may be utilized during the same test cycle or during subsequent test cycles. For example, if the detector device 10 includes ten substance emitters 36, and one of the substance emitters 36 is utilized for one test cycle per year, then the detector device 10 provides ten years of testing capability without a user 74 having to test manually by spraying aerosol at the detector device 10.

In some embodiments, multiple substance emitters 36 may be utilized simultaneously during a single test cycle. For example, a first substance emitter 36*a* and a second substance emitter 36*b*, each on opposite sides of an optical pathway (e.g., the axis 50) between light source 32 and sensor 34, may be utilized to optimize flow of the one or more substances 46 emitted within chamber 30.

Speaker 38 is a device configured to emit an audible alarm 70. Further, speaker 38 may be communicatively connected to sensor 34. The audible alarm 70 may be sounded based, at least in part, on a signal from sensor 34. For example, in embodiments where sensor 34 is configured to detect the one or more substances 46, speaker 38 may be configured to emit the audible alarm 70 based, at least in part, on sensor 34 detecting the one or more substances 46 above a threshold. In embodiments where sensor 34 is configured to detect the light 48 emitted from light source 32, speaker 38 may be configured to emit the audible alarm 70 based, at least in part, on sensor 34 detecting light 48 above and/or below a threshold. Specifically, in embodiments where light source 32 and sensor 34 are on axis 50, the alarm may be emitted based, at least in part, on detecting light 48 below the threshold. In embodiments where light source 32 and sensor 34 are off axis 50, the alarm may be emitted based, at least in part, on detecting light 48 above the threshold. As such, via speaker 38, detector device 10 may provide an audible alarm 70 to individuals proximate detector device 10 based, at least in part, on certain conditions. These conditions may be hazardous to the health and/or safety of the individuals. In some embodiments, speaker 38 may be configured to emit an alarm sound that is outside of the range of human hearing when detector device 10 is in the test mode. In other embodiments, speaker 38 may be configured to not emit the audible alarm 70 despite the substances 46 and/or light 48 being detected as passing the threshold based, at least in part, on detector device 10 being in the test mode. That way, the test mode can be conducted silently.

User interface 40 may be configured to receive an input 72 (see FIG. 2) from the user 74. The input 72 may be configured to initiate a test mode and/or test cycle of detector device 10. User interface 40, for example, may be a physical button or hard key, a soft key, such as an icon on a display, or a cap-touch sensor. As such, user interface 40 may serve to initiate a test mode and/or test cycle for detector device 10. Further, user interface 40 may be communicatively connected to the one or more substance emitter 36. As such, based, at least in part, on the received input 72 and/or test cycle, substance emitter 36 may be activated to emit the one or more substances 46.

In operation, a test mode and/or cycle may be initiated by the user's 74 input 72 via user interface 40. During a test cycle, substance emitter 36 may be activated to emit the one or more substances 46 to occupy chamber 30. The one or more substances 46 in turn may trigger the audible alarm 70 from the speaker 38. Specifically, in embodiments where sensor 34 is configured to detect the one or more substances 46, the one or more substances 46 emitted may cause sensor 34 to detect the one or more substances 46 above a threshold, triggering the audible alarm 70. In embodiments where sensor 34 is configured to detect light 48 and is disposed on axis 50 with light source 32, the emitted substances 46 may substantially reduce the transmittance of the light 48 through chamber 30 and thus reduce the detected light 48 to below the threshold, triggering the audible alarm 70. In embodiments where sensor 34 is configured to detect light 48 and is disposed off axis 50 with light source 32, the one or more substances 46 emitted may substantially scatter the emitted light 48 such that some of the emitted light 48 is re-directed to sensor 34. Thus, sensor 34 may detect the light 48 above the threshold, triggering the audible alarm 70. In these various embodiments, the triggering of the audible alarm 70 may indicate to the user 74 that detector device 10 is in working order.

In embodiments, surfaces of the chamber 20 include coatings or structures that allow the reflectivity to be changed (e.g., based on instructions from a controller 84, see FIG. 7, discussed further below). For example, surfaces of the chamber 20 can include reflective paint covered with an additional layer of thermochromic paint. With the inclusion of a heat source, the surface could be heated to cause the thermochromic paint to clarify revealing the high reflectance paint. This would cause more light to enter the detector and thus simulate smoke. As another example, the reflective paint could be covered with an additional layer of ultraviolet (UV) active paint. With the inclusion of an additional UV light emitter within the chamber 20, the UV active paint could be caused to clarify when exposed to the UV light during the test cycle. As another example, a polymer dispersed liquid crystal (PDLC) material could be applied over the high reflectance paint and, when a voltage is applied to the PDLC material, the reflectivity within chamber 20 can be changed during the test cycle. Another option is an electrochromic material such as a conductive polymer electrochromic (CPEC) or tungsten oxide. In embodiments, the detector device 10 simulates the size of the one or more substances 46 by including (i) an optic/glass with various sized scatterers imbedded or etched therein and (ii) another LED pointed at that specific scatterer and activated during the test cycle.

As mentioned, the detector device 10 can further include the screen 28. The test cycle can additionally or alternatively determine whether the screen 28 is blocked or partially blocked to a suboptimal degree. For example, the detector device 10 can further include a light source (e.g., an LED or an end of a light guide) disposed outside of the chamber 20 (e.g., on the cover 22) and a light sensor also disposed outside the chamber 20. During the test cycle, the light source disposed outside of the chamber 20 is activated, the light sensor also disposed outside the chamber 20 produces output indicative of, for example, the light intensity received, and the sensor 34 inside the chamber 20 also produces output indicative of the light intensity received, and a comparison is made (e.g., by the controller 84). If the comparison fails to meet a preset criteria (e.g., sensor 34 reveals light intensity within chamber 20 is 50% or below light intensity that the outside sensor reveals), then the screen 34 can be determined to be suboptimally blocked.

Feedback device 42 may be configured to provide the user 74 with feedback 76 relating to a state of one or more components of detector device 10. As such, feedback device 42 may indicate successful testing results. In some embodiments, feedback device 42 may be a light, and thus provide feedback 76 (sec FIG. 2) via illumination. In other embodiments, feedback device 42 may be a display 78. The display 78 may be common to both feedback device 42 and user interface 40 or anywhere else the test cycle was initiated (e.g., by phone, by control panel, and so on). For example, after a successful test cycle, the feedback 76 can be a green light.

In some embodiments, feedback device 42 may be communicatively connected to sensor 34. As such, the feedback 76 may be based, at least in part, on sensor 34 detecting the certain substances 46 above the threshold or based, at least in part, on sensor 34 detecting light 48 above and/or below the threshold. Thus, the feedback 76 may indicate to the user 74 whether one or more components of detector device 10, such as substance emitter 36 and/or sensor 34, were functioning properly or improperly during the test cycle.

In some embodiments, feedback device 42 may include an alarm sensor 80 as a second sensor. The alarm sensor 80 may be a sensor 34 configured to detect vibrations 81 from an audible alarm 70 emitted from speaker 38. For example, the alarm sensor 80 may be a piezoelectric sensor 34 or microphone configured to provide a signal based, at least in part, on detection of vibrations 81 from the audible alarm 70. Accordingly, the feedback 76 may indicate to the user 74 whether one or more components of detector device 10, such as substance emitter 36 and/or sensor 34, were functioning properly or improperly during the test cycle.

In some embodiments, speaker 38 may be configured to disable during the test mode. In such an embodiment, feedback device 42 may be configured to provide feedback 76 to the user 74 regarding whether one or more components of detector device 10 were functioning properly or improperly during the test cycle without disrupting others due to the emission of the audible alarm 70. This may be advantageous for allowing testing during times of business without causing a substantial disruption.

Figure 7:
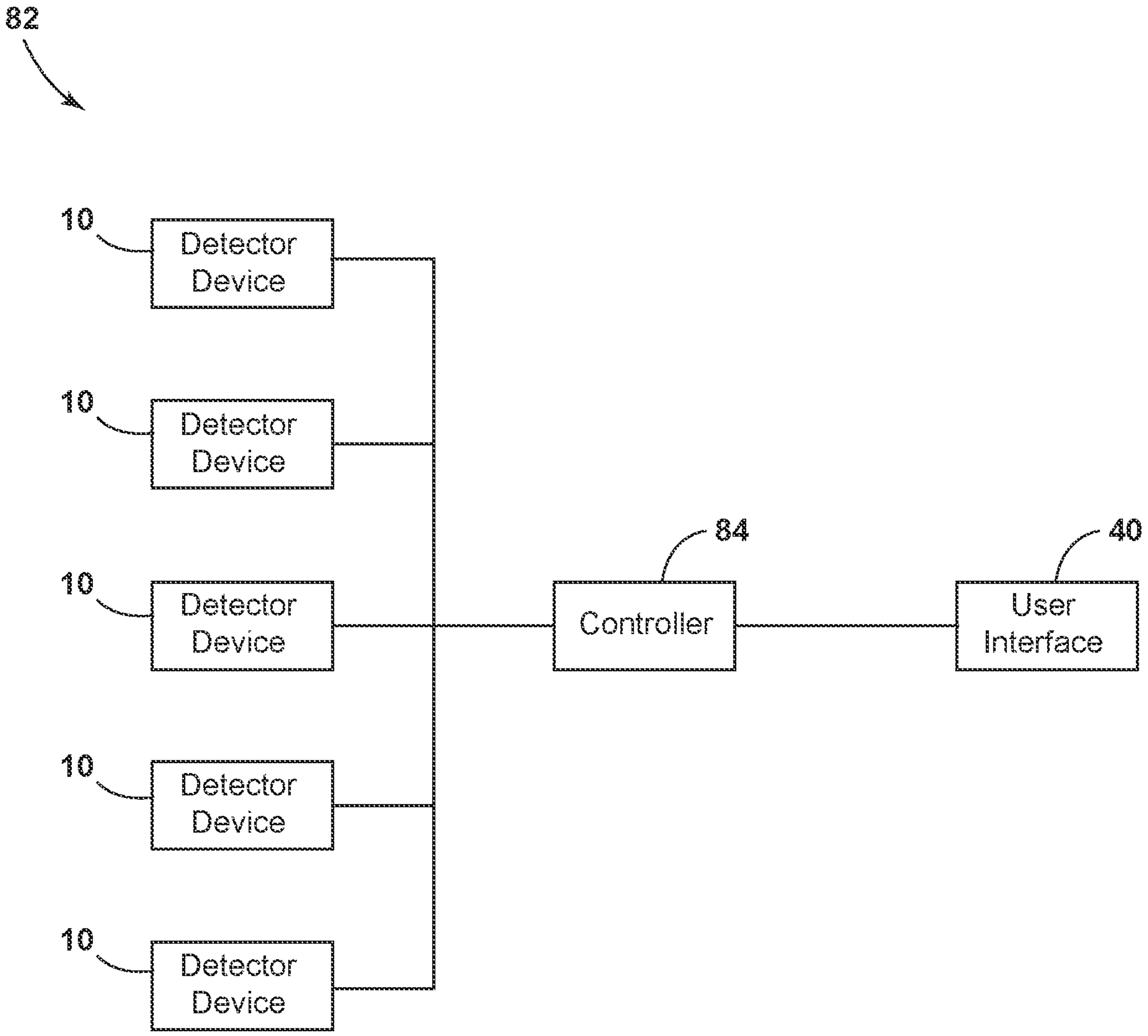
FIG. 7 is a schematic diagram of a detector system that includes numerous detector devices in communication with a controller.

Referring additionally to FIG. 7, in some embodiments, detector device 10 may be part of a detector system 82. System 82 may have a plurality of detector devices 10. Further, system 82 may have a controller 84 communicatively connected to one or more of the detector devices 10 of system 82.

Controller 84 may comprise a memory and a processor. The memory and processor may be communicatively coupled to one another. The processor, for example, may be any device capable of processing electronic instructions. Examples include a microprocessor and/or an application specific integrated circuit (ASIC). Further, the processor may be configured to execute one or more instructions stored in the memory. The memory may be a non-transitory computer usable or readable medium, which may include one or more storage devices or articles. Accordingly, the memory may be operable to store one or more instructions. Examples of the memory include conventional hard disks, solid-state memories, random access memories (RAM), read-only memory (ROM), erasable programmable read-only memory (EPROM), electronically erasable programmable read-only memory (EEPROM), optical or magnetic disks, and dynamic random access memory (DRAM).

In some embodiments, controller 84 may be communicatively connected to the one or more detector devices 10 by a hard wire connection, such as via an alarm network tandem line. In other embodiments, controller 84 may be disposed remotely relative to and communicatively connected to the one or more detector devices 10 via a wireless connection. Specifically, controller 84 may be communicatively connected to one or more substance emitters 36. Further, controller 84 may include and/or be able to carry out the functions of user interface 40 and/or feedback device 42 for one or more of the detector devices 10. The user 74 can initiate test cycles for one or more of the detector devices 10 via the user interface 40 in communication with the controller 84, and the user interface 40 can be located separate from any one or all of detector devices 10.

The detector device 10 addresses the problem described in the Background (and other problems), in that a user 74 need not transport to the detector device 10 and expose the detector device 10 to an aerosol in order to simulate smoke and wait to see if an alarm is triggered. Rather, the detector device 10 includes its own substance emitter 36 to emit substances 46 during a test cycle that can be detected by the sensor 34 to trigger the audible alarm 70. That eliminates the need for the user 74 to obtain aerosol and direct it to the detector device 10. Further, the detector device 10 can perform the test cycle without user involvement at all, because substance emitter 36 is an integrated component. In embodiments, the detector device 10 and/or the detector system 82 notifies and/or otherwise involves the user 74 as a consequence of a test cycle indicating that one or more of the detector devices 10 is functioning improperly or suboptimally.

As used herein, "communicatively connected" may mean connected directly or indirectly though one or more electrical components.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

In this document, relational terms, such as "first," "second," and the like, are used solely to distinguish one entity or action from another entity or action, without necessarily requiring or implying any actual such relationship or order between such entities or actions.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; B and C in combination; or A, B, and C in combination.

The terms "includes," "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

According to a first aspect of the present disclosure, a detector device comprises: (i) a chamber configured to allow ambient air and one or more substances to enter; (ii) a light source configured to emit light into the chamber; (iii) a sensor configured to detect light within the chamber; (iv) a substance emitter configured to emit one or more substances during a test cycle of the detector device; and (v) a speaker configured to emit an audible alarm when the light sensed by the sensor passes a threshold.

According to a second aspect of the present disclosure, the detector device of the first aspect is presented, wherein the substance emitter is a filament configured for ignition during the test cycle to give off the one or more substances.

According to a third aspect of the present disclosure, the detector device of the first aspect is presented, wherein the substance emitter is a chemical reactor configured to facilitate a chemical reaction between at least two different chemicals to produce and emit the one or more substances during the test cycle.

According to a fourth aspect of the present disclosure, the detector device of the third aspect is presented, wherein the chemical reactor facilitates the chemical reaction by housing at least two of the at least two different chemicals separated from one another and combining them during the test cycle.

According to a fifth aspect of the present disclosure, the detector device of any one of the third through fourth aspects is presented, wherein the chemical reactor facilitates the chemical reaction by housing the at least two different chemicals together and providing a non-chemical stimulus during the test cycle to initiate the chemical reaction.

According to a sixth aspect of the present disclosure, the detector device of the first aspect is presented, wherein the substance emitter is a resistor configured to emit the one or more substances when exposed to an electrical current traveling therethrough during the test cycle.

According to a seventh aspect of the present disclosure, the detector device of the sixth aspect is presented, wherein the resistor has a coating which is configured to emit the one or more substances upon the resistor's exposure to the electrical current.

According to an eighth aspect of the present disclosure, the detector device of the seventh aspect is presented, wherein the coating comprises propylene glycol.

According to a ninth aspect of the present disclosure, the detector device of any one of the first through eighth aspects is presented, wherein the substance emitter is configured to emit a sufficient quantity of the one or more substances to cause the light sensed by the sensor to pass the threshold for only one test cycle.

According to a tenth aspect of the present disclosure, the detector device of any one of the first through ninth aspects is presented, wherein the detector device has a plurality of substance emitters.

According to an eleventh aspect of the present disclosure, the detector device of the tenth aspect is presented, wherein the plurality of substance emitters comprises a first substance emitter and a second substance emitter on opposite sides of an optical pathway between the light source and the sensor relative to one another.

According to a twelfth aspect of the present disclosure, the detector device of any one of the first through eleventh aspects is presented, wherein the substance emitter is disposed outside of the chamber.

According to a thirteenth aspect of the present disclosure, the detector device of any one of the first through eleventh aspects is presented, wherein the substance emitter is disposed within the chamber.

According to a fourteenth aspect of the present disclosure, the detector device of any one of the first through thirteenth aspects is presented, wherein the light detected by the sensor is the light emitted from the light source, and the audible alarm is emitted when the light sensed by the sensor falls below the threshold.

According to a fifteenth aspect of the present disclosure, the detector device of any one of the first through fourteenth aspects is presented, wherein (i) the light detected by the sensor is scattered by the one or more substances in the chamber and not directly received from the light source, and (ii) the audible alarm is emitted when the light sensed by the sensor is above the threshold.

According to a sixteenth aspect of the present disclosure, the detector device of any one of the first through fifteenth aspects further comprises a user interface configured to receive an input from a user to initiate the test cycle.

According to a seventeenth aspect of the present disclosure, the detector device of any one of the first through sixteenth aspects further comprises a feedback device configured to provide a user with feedback to indicate a successful test cycle.

According to an eighteenth aspect of the present disclosure, the detector device of the seventeenth aspect is presented, wherein the feedback device determines a successful test cycle based, at least in part, on a second sensor configured to detect vibrations from the audible alarm.

According to a nineteenth aspect of the present disclosure, the detector device of the seventeenth aspect is presented, wherein the speaker is disabled during the test cycle.

According to a twentieth aspect of the present disclosure, a detector device comprises: (i) a chamber configured to allow ambient air and one or more substances to enter; (ii) a substance sensor disposed within the chamber, the substance sensor configured to detect certain of the one or more substances; (iii) a substance emitter configured to emit the one or more substances detectable by the substance sensor during a test cycle of the detector device; and (iv) a speaker configured to emit an audible alarm when the substance sensor detects the one or more substances above a threshold.

According to a twenty-first aspect of the present disclosure, the detector device of the twentieth aspect is presented, wherein the substance emitter is a filament configured for ignition during the test cycle to give off the one or more substances.

According to a twenty-second aspect of the present disclosure, the detector device of the twentieth aspect is presented, wherein the substance emitter is a chemical reactor configured to facilitate a chemical reaction between at least two different chemicals to produce and emit the one or more substances during the test cycle.

According to a twenty-third aspect of the present disclosure, the detector device of the twenty-second aspect is presented, wherein the chemical reactor facilitates the chemical reaction by housing the at least two different chemicals separate from one another and combining them during the test cycle.

According to a twenty-fourth aspect of the present disclosure, the detector device of the twenty-second aspect is presented, wherein the chemical reactor facilitates the chemical reaction by housing the at least two different chemicals together and providing a non-chemical stimulus during the test cycle to initiate the chemical reaction.

According to a twenty-fifth aspect of the present disclosure, the detector device of the twentieth aspect is presented, wherein the substance emitter is a resistor configured to emit the one or more substances when exposed to an electrical current traveling therethrough during the test cycle.

According to a twenty-sixth aspect of the present disclosure, the detector device of the twenty-fifth aspect is presented, wherein the resistor has a coating which is configured to emit the one or more substances upon the resistor's exposure to the electrical current.

According to a twenty-seventh aspect of the present disclosure, the detector device of the twenty-sixth aspect is presented, wherein the coating comprises propylene glycol.

According to a twenty-eighth aspect of the present disclosure, the detector device of any one of the twentieth through twenty-seventh aspects is presented, wherein the substance emitter is configured to emit a sufficient quantity of the one or more substances to cause the light sensed by the sensor to pass the threshold for only one test cycle.

According to a twenty-ninth aspect of the present disclosure, the detector device of any one of the twentieth through twenty-eighth aspects is presented, wherein the detector device has a plurality of substance emitters.

According to a thirtieth aspect of the present disclosure, the detector device of the twenty-ninth aspect is presented, wherein the plurality of substance emitters comprises a first substance emitter and a second substance emitter on opposite sides of an optical pathway between the light source and the sensor relative to one another.

According to a thirty-first aspect of the present disclosure, the detector device of any one of the twentieth through thirtieth aspects is presented, wherein the substance emitter is disposed outside of the chamber.

According to a thirty-second aspect of the present disclosure, the detector device of any one of the twentieth through thirtieth aspects is presented, wherein the substance emitter is disposed within the chamber.

According to a thirty-third aspect of the present disclosure, the detector device of any one of the twentieth through thirty-second aspects further comprises a user interface configured to receive an input from a user to initiate the test cycle.

According to a thirty-fourth aspect of the present disclosure, the detector device of any one of the twentieth through thirty-third aspects further comprises a feedback device configured to provide a user with feedback to indicate a successful test cycle.

According to a thirty-fifth aspect of the present disclosure, the detector device of the thirty-fourth aspect is presented, wherein the feedback device determines a successful test cycle based, at least in part, on a second sensor configured to detect vibrations from the audible alarm.

According to a thirty-sixth aspect of the present disclosure, the detector device of any one of the twentieth through thirty-fifth aspects is presented, wherein the speaker is disabled during the cycle.

According to a thirty-seventh aspect of the present disclosure, the detector device of any one of the twentieth through thirty-sixth aspects is presented, wherein the one or more substances include carbon monoxide.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A detector device, comprising:

a chamber configured to allow ambient air and one or more substances to enter;

a light source configured to emit light into the chamber;

a sensor configured to detect light within the chamber;

a substance emitter configured to emit one or more substances during a test cycle of the detector device; and a speaker configured to emit an audible alarm when the light sensed by the sensor passes a threshold, wherein the substance emitter is either (i) a filament configured for ignition during the test cycle to emit the one or more substances or (ii) a chemical reactor configured to facilitate a chemical reaction between at least two different chemicals to produce and emit the one or more substances during the test cycle.

2. The detector device of claim 1, wherein the substance emitter is a filament configured for ignition during the test cycle to emit the one or more substances.

3. The detector device of claim 1, wherein the substance emitter is a chemical reactor configured to facilitate a chemical reaction between at least two different chemicals to produce and emit the one or more substances during the test cycle.

4. The detector device of claim 1, wherein the substance emitter is configured to emit sufficient quantity of the one or more substances to cause the light sensed by the sensor to pass the threshold for only one test cycle.

5. The detector device of claim 1, wherein the detector device has a plurality of substance emitters, and the plurality of substance emitters comprises a first substance emitter and a second substance emitter on opposite sides of an optical pathway between the light source and the sensor relative to one another.

6. The detector device of claim 1, wherein the substance emitter is disposed proximate the chamber.

7. The detector device of claim 1, wherein the substance emitter is disposed within the chamber.

8. The detector device of claim 1, wherein the light detected by the sensor is the light emitted from the light source and the audible alarm is emitted when the light sensed by the sensor falls below the threshold.

9. The detector device of claim 1, wherein:

the light detected by the sensor is scattered by the one or more substances in the chamber and not directly received from the light source, and the audible alarm is emitted when the light sensed by the sensor is above the threshold.

10. The detector device of claim 1, further comprising a user interface configured to receive an input from a user to initiate the test cycle.

11. The detector device of claim 1 further comprising a feedback device configured to provide a user with feedback to indicate that the test cycle was successful.

12. The detector device of claim 11, wherein the speaker is disabled during the test cycle.

13. The detector device of claim 1, wherein the sensor is a light sensor.

14. The detector device of claim 1 further comprising a blocking positioned to block the light emitted from the light source in a direction toward the sensor.

15. The detector device of claim 3, wherein the chemical reactor facilitates the chemical reaction by housing at least two of the at least two different chemicals separate from one another and combining them during the test cycle.

16. The detector device of claim 3, wherein the chemical reactor facilitates the chemical reaction by housing the at least two different chemicals together and providing a non-chemical stimulus during the test cycle to initiate the chemical reaction.

17. The detector device of claim 1 further comprising a housing and a cover together defining the chamber and collectively including an inlet to allow ambient air to enter into the chamber.

18. A detector device comprising:

a housing and a cover together defining a chamber and collectively including an inlet to allow ambient air to enter into the chamber;

a light source configured to emit light;

a sensor configured to detect light within the chamber;

a resistor configured to emit one or more substances when exposed to an electrical current traveling therethrough during a test cycle of the detector device; and a speaker configured to emit an audible alarm when the light sensed by the sensor passes a threshold.

19. The detector device of claim 18, wherein the resistor has a coating which is configured to emit the one or more substances upon the resistor's exposure to the electrical current.

20. A detector device comprising:

a housing and a cover together defining a chamber and collectively including an inlet to allow ambient air to enter into the chamber;

a light source configured to emit light;

a sensor configured to detect light within the chamber;

a substance emitter configured to emit one or more substances during a test cycle of the detector device;

a speaker configured to emit an audible alarm when the light sensed by the sensor passes a threshold; and a feedback device configured to provide a user with feedback to indicate that the test cycle was successful, wherein, the feedback device determines that the test cycle was successful based, at least in part, on a second sensor configured to detect vibrations from the audible alarm.

* * * * *